2 Sheets—Sheet 1.

W. J. LANE & W. H. FIELD.
HORSE HAY RAKE.

No. 174,912.  Patented March 21, 1876.

Witnesses:
J. P. Theodore Lang,
Jno. S. Slater.

Inventor:
William J. Lane
William H. Field
by Mason Fenwick Lawrence

2 Sheets—Sheet 2.
W. J. LANE & W. H. FIELD.
HORSE HAY RAKE.
No. 174,912. Patented March 21, 1876.
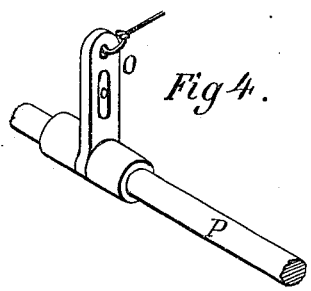
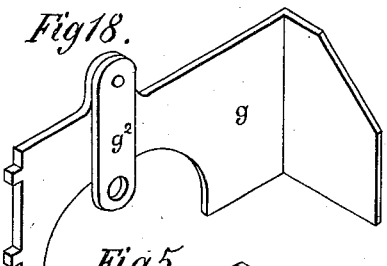
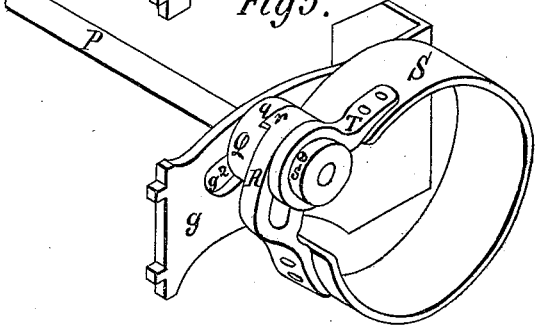
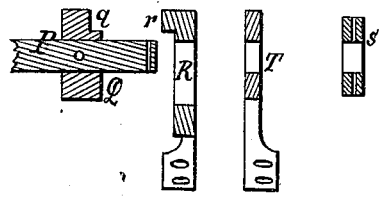
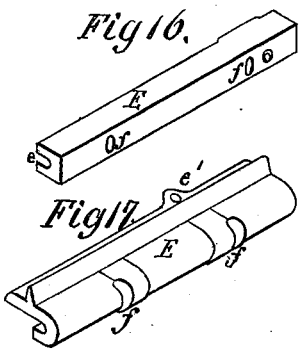
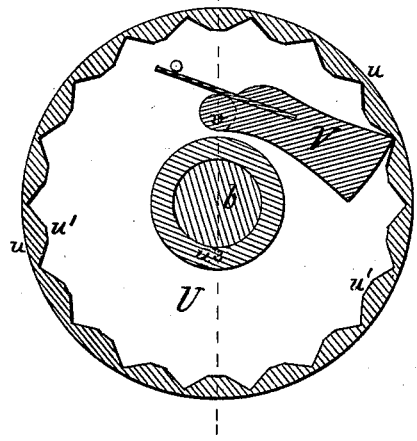
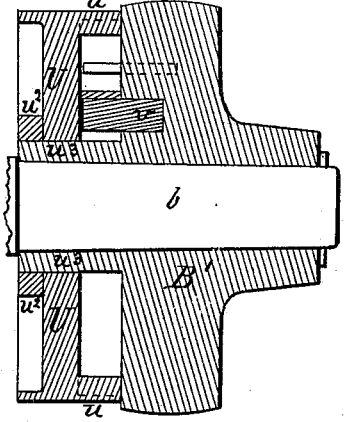
Witnesses:
J. P. Theodore Lang
Jno. S. Slater
Inventor:
William J. Lane
William H. Field
by
Mason Fenwick Lawrence

UNITED STATES PATENT OFFICE.

WILLIAM J. LANE, OF MILLBROOK, AND WILLIAM H. FIELD, OF PORT CHESTER, NEW YORK.

IMPROVEMENT IN HORSE HAY-RAKES.

Specification forming part of Letters Patent No. 174,912, dated March 21, 1876; application filed January 26, 1876.

*To all whom it may concern:*

Be it known that we, WILLIAM J. LANE, of Millbrook, county of Dutchess, and WILLIAM H. FIELD, of Port Chester, in the county of Westchester, and State of New York, have invented certain new and useful Improvements in Horse Hay-Rakes; and we do hereby declare that the following is a full, clear, and exact description thereof, which will enable others skilled in the art to which it appertains to make and use the same, reference being had to the accompanying drawings, and to the letters of reference marked thereon, which form a part of this specification, in which—

Figure 1:
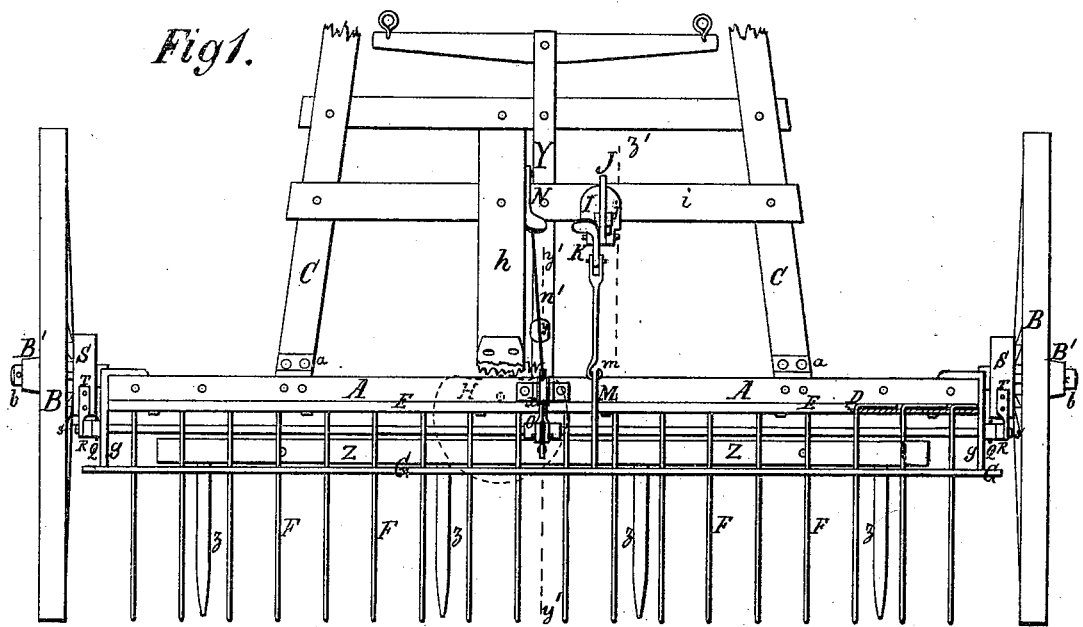
Figure 2:
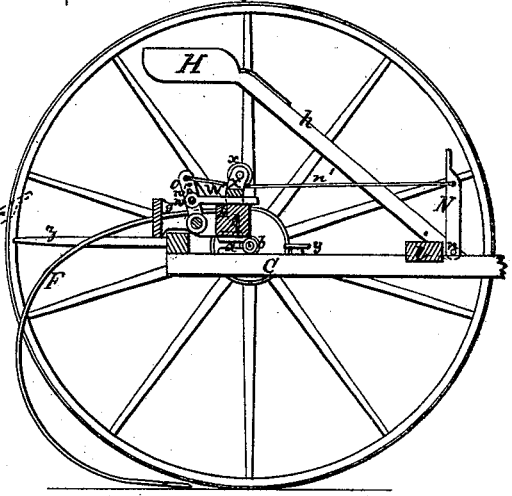

Figure 1 is a top view of our improved rake; Fig. 2, a vertical section on the line $y'$ $y'$, Fig. 1; and Fig. 3 a vertical section on the line $z'$ $z'$, Fig. 1. Figs. 4 and 5 are enlarged perspective views of the parts by which the dumping of the hay is effected. Figs. 6 to 15 inclusive are detailed views of the above-mentioned parts. Fig. 16 is a perspective view of a metallic rake-tooth bearing. Fig. 17 is a modification of the same. Fig. 18 is a modification of the manner of hanging the operating rod of the friction apparatus represented in Figs. 4 and 5.

The nature of our invention consists in certain constructions and combinations of parts, as hereinafter described and specifically claimed, whereby the following objects are secured, viz: first, the rake-teeth are held more firmly while yielding in a vertical plane, and are kept from lateral play, and their wearing action on the rake-head greatly lessened; second, the parts whereby the dumping of the hay is effected by the draft of the team are not liable to get out of order, and are rendered more effective in their operation, even under the most disadvantageous circumstances.

In the drawings, A designates the axle-tree supported by wheels B. The iron axles $b$, which are fastened to the ends of the said axle-tree, are in the same central line with the hinges $a$ by which the axle-tree is attached to the shafts C. The said axle-tree A may be provided at its rear upper corner with a rabbet, D, or it may be made without such rabbet.

E is a U-shaped metal bearing fastened by horizontal bolts to the rear vertical side of the axle-tree, and with its groove $e$ opening toward the front of the machine. This U-shaped metallic fastening may be seated in the rabbet D, or it may be secured to any surface that is vertical or nearly so, and in such a way as to leave the open part of the metal fastening forward, thereby giving in one piece of metal bearing-surface for the tooth in every direction in which the strain is brought to bear—viz: upward, downward, and backward—and if the front were left almost entirely open the teeth would yet be securely held while at work.

The rake-teeth F are inserted into the oblong holes $f$ of this bearing, with their rectangularly-bent ends embedded in the groove $e$. By this means of confining the rake-teeth, lateral movements of the points or lower ends of the teeth are prevented, the socket being so formed in one piece of metal as to resist all lateral strain at the points of the teeth and all backward strain on them, independently of any other bearing-surface.

The lifting-bar G of the rake-teeth is fastened to the axle-tree by means of the bracket $g$, and it is provided with vertically-oblong holes $g'$ through which the rake-teeth are passed, and which, in connection with the holes $f$, allow as much vertical play to each rake-tooth as is deemed necessary to overcome small obstacles on the ground.

At a suitable distance from the seat H of the driver, and pivoted to the plate I on the cross-beam $i$, are the hand-lever J and foot-lever K, the former having a lug, $j$, by means of which it may take the foot-lever K along with it in its backward movement. A connecting-rod, L, with pivot-holes $l$ for adjustment of the stroke, is pivoted to the lower arm of the said foot-lever, and to a bracket, M, at $m$, said bracket being fastened to the axle-tree A and to the lifting-bar G.

Figure 3:
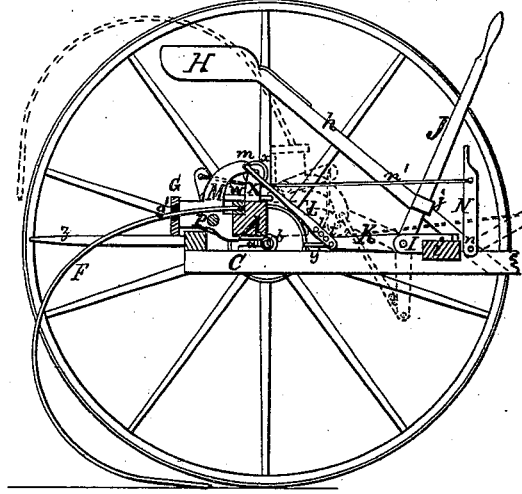

The backward movement of the hand lever J causes the foot-lever K to move with it in the same direction, and thereby to raise the lifting-bar G and the rake-teeth F, and to turn the axle-tree on the hinges $a$ and axles $b$. Another foot-lever, N, is pivoted at $n$ to the seatbar $h$, and is connected by means of a cord, $n'$, with the lever O on the shaft P. The shaft P is passed through the plates M and $g$, and outside of the latter it is provided with one or two lifting-toes, Q, (one on each end, if two are used,) consisting of a circular shoulder with a stepped segmental depression, $q$, which forms a plane at its base, and into which a stepped or raised segment, $r$, of the slotted link R is fitted. The said link R is fastened to one end of the friction-strap S, the other end of which is provided with a stationary link, T, fitted loosely on the shaft P and next to the slotted link R. The said links are held in position by and between the lifting-toe Q and the collar $s$ at the end of the shaft P. When the foot-lever is pressed forward the rod P and the lifting toe or toes Q (accordingly as one or two toes are used) are turned out of their normal positions, and the high corners of the bases of the segmental depressions $q$ push the segments $r$ of the links R from them, thereby tightening the strap S around the friction-pulley U. The said friction-pulley is provided with inner ratchet-teeth $u^1$, and is operated during the forward movement of the machine by a removable spring-pawl, V, pivoted by a pivot, $v$, of the pawl to the face of the wheel-hub B'. The ratchet-teeth $u^1$ have the same slope on both sides, and will answer for either wheel of the rake-carriage, and, in case of wear, one ratchet may be exchanged for the other, and perfect wearing-surfaces thereby presented. To prevent the pulleys U from wearing against the face of the axles or against the brackets $g$, a washer, $u^2$, of proper bearing metal is placed on the reduced part of the hub $u^3$ and between the axle-tree and pulley U, so as to afford a sufficient wearing-surface on the respective hubs B. The hubs from the collars or shoulders of the axles are reduced in diameter along a portion of their length, as represented in Fig. 3, so that the friction-pulley U and the washer $u^2$ may be fitted upon them. The lever O of the torsion-rod P is provided with a longitudinal slot, $o$, in which a pin, $w$, on the forked end $w'$ of the bolt W is passed loosely, so that the said bolt while held in place may move through a straight bearing or guide of a pulley-standard, X.

$x$ is a guide-pulley for the cord $n'$. The draw-bar Y of the hay-rake is provided with an adjustable stop or thrust-head, $y$, by which the downward motion of the bolt W is stopped, thereby preventing further strain upon the friction-strap S after the teeth are raised to the proper height. Z and $z$ is the "rake-clearer" attached as usual to the rear ends of the shafts.

The bearing E may be in one piece or in sections, and modified so as to be fastened by vertical instead of horizontal bolts. When the bearings are thus modified they are provided with horizontal flanges $e'$, and the holes $f$ may be converted into open slots, to facilitate the insertion of the rake-teeth, as illustrated by Fig. 17.

Either form of rake-tooth bearing may be applied without the rabbet, and still have the U-shaped bearing in the rear of the vertical support, and with its groove $e$ facing the front of the machine.

The brackets $g$ are provided with slotted bearings $g^2$, which support the ends of the rod P, and permit sufficient play for the purpose of avoiding the injurious consequences resulting from sudden and violent movements of the machine; and the same object may be obtained by an oscillating bearing, $g^2$, Fig. 18, pivoted to the bracket $g$.

By making the rod P sufficiently thin it becomes elastic to such a degree as to compensate for slight inaccuracies in the construction of the parts of the friction apparatus, or, in case the wear on either side should become unequal, it might in some cases be practicable to use only one friction-strap in connection with the torsion-rod and other parts, but I prefer to use two, as shown.

Operation: The driver on the seat H places one of his feet on the foot-lever K, and by a constant pressure from him keeps the rake-teeth down to their work. Any slight unevenness of the ground does not injure the teeth, as they have vertical play to a limited extent in the bearing-holes $g^1$ and $f$, but greater obstructions are to be avoided by the driver lifting the rake-teeth bodily by means of the hand-lever J.

When the hay is to be dumped by the power of the team the driver removes his foot from the foot-lever K, and places one of his feet on the foot-lever N, and pushes it from him, thereby drawing the cord $n'$ taut, and turning the rod P, and the lifting-toe Q. By this operation the flat step-surfaces formed by the segmental depressions $q$ push the links R from them and tighten the friction-straps S around the friction-pulleys U. This effected, the forward motion of the said friction-pulleys will cause the friction-straps, the rod P, the lifting-bar G, the axle-tree A, the bolt W, and the rake-teeth F, to move together about the axis of the rake-carriage, viz., the hinges $a$ and the axles $b$. The hay collected by the rake-teeth F is cleared from them by the fingers $z$ of the clearer. The bolt W strikes the stop or head $y$, and arrests the rake-head, and prevents undue strain upon the torsion-rod P, and links T and R. The slight jerk produced by the contact of the bolt W with the stop $y$ upon the foot-lever N reminds the driver that he should release the foot-lever N, and allow the rake-head and parts connected therewith to fall back to their normal position.

Having thus described our invention, what we claim as new, and desire to secure by Letters Patent, is—

1. In a horse hay-rake the automatic dumping apparatus, combining the foot-lever N, the torsion-rod P, the lifting-toe Q, the link R, the stationary link T, the friction-strap S, the friction-pulley U, and wheel-hub B', substantially as and for the purpose set forth.

2. The metallic rake-tooth-holding bar, grooved on its inner side, perforated with a series of tooth receiving holes, and adapted for application to the side of the rake-head, substantially as described.

3. The combination of the wheel-hub B′, having the reduced parts $u^3$, the friction-pulley U, and the loose bearing-washer $u^2$, constructed and operating substantially as and for the purpose described.

4. The torsion-rod P, hung so as to be free to move laterally toward and from the friction-pulley U, substantially as described.

5. The combination of the torsion-rod P, the lifting-toe Q, and the links R and T, and the friction-strap S, substantially as and for the purpose described.

6. The combination of the torsion-rod P, slotted lever O, sliding bolt W, having a shifting connecting-pin, w, and stop y, constructed and operating substantially as described.

In testimony that we claim the foregoing as our own, we hereto affix our signatures in the presence of two witnesses.

WILLIAM J. LANE.
WILLIAM H. FIELD.

Witnesses:
JAMES DEARING,
JOHN E. MARSHALL.